(12) United States Patent
Fong

(10) Patent No.: US 7,717,463 B2
(45) Date of Patent: May 18, 2010

(54) STEERING COLUMN SET WITH CHANGEABLE ANGLE AND LENGTH

(76) Inventor: Jian-Jhong Fong, No. 37, Alley 54, Lane 944, Sec. 2, Jhongshan Rd., Changhua City, Changhua County 500 (TW)

( * ) Notice: Subject to any disclaimer, the term of this patent is extended or adjusted under 35 U.S.C. 154(b) by 203 days.

(21) Appl. No.: 11/735,437

(22) Filed: Apr. 14, 2007

(65) Prior Publication Data
US 2008/0252055 A1 Oct. 16, 2008

(51) Int. Cl.
*B62D 1/18* (2006.01)
(52) U.S. Cl. .................... 280/775; 280/779; 74/493
(58) Field of Classification Search ............... 280/775, 280/779; 74/493
See application file for complete search history.

(56) References Cited
U.S. PATENT DOCUMENTS

| | | | | |
|---|---|---|---|---|
| 4,900,059 A * | 2/1990 | Kinoshita et al. | ............ | 280/775 |
| 5,235,734 A * | 8/1993 | DuRocher et al. | ........... | 29/455.1 |
| 5,520,416 A * | 5/1996 | Singer et al. | ................ | 280/775 |
| 5,711,189 A * | 1/1998 | Cartwright et al. | ............ | 74/493 |
| 5,890,397 A * | 4/1999 | Stoner et al. | .................. | 74/493 |
| 6,640,661 B2 * | 11/2003 | Duncan et al. | ................ | 74/493 |
| 6,758,494 B2 * | 7/2004 | Bannon et al. | ............... | 280/775 |
| 7,178,422 B2 * | 2/2007 | Armstrong et al. | ............ | 74/493 |
| 7,191,679 B2 * | 3/2007 | Tomaru et al. | ................ | 74/493 |
| 7,198,425 B2 * | 4/2007 | Bergkvist et al. | ......... | 403/359.5 |
| 7,226,082 B2 * | 6/2007 | Muramatsu et al. | ......... | 280/775 |
| 2003/0192392 A1 * | 10/2003 | Gaeth | ......................... | 74/493 |
| 2005/0104354 A1 * | 5/2005 | Yamada et al. | ............. | 280/775 |
| 2007/0170711 A1 * | 7/2007 | Bechtel et al. | .............. | 280/775 |
| 2008/0143092 A1 * | 6/2008 | Menjak et al. | .............. | 280/775 |
| 2008/0238068 A1 * | 10/2008 | Kumar et al. | ............... | 280/775 |

* cited by examiner

*Primary Examiner*—Ruth Ilan
*Assistant Examiner*—James English

(57) ABSTRACT

A steering column set includes a first steering column, a second steering column, an extending device and a tilting device. The first steering column is connected to a steering wheel. The second steering column is telescopically connected to the first steering column. The extending unit is used to move the first steering column with respect to the second steering column. The tilting unit is used to tilt the first and second steering columns.

2 Claims, 9 Drawing Sheets

STEERING COLUMN SET WITH CHANGEABLE ANGLE AND LENGTH

BACKGROUND OF INVENTION

1. Field of Invention

The present invention relates to a steering column set with changeable angle and length.

2. Related Prior Art

A steering column is arranged between a steering wheel and a universal joint that is further connected to a steering mechanism for steering the front wheels of the vehicle. A driver steers the vehicle by turning the steering wheel.

Conventionally, the angle and length of a steering column is fixed. Therefore, it is difficult for a very tall or short driver to turn the steering wheel properly without adjusting the position of the driver seat. If the driver is very short, it is dangerous for the driver whose face is very close to the steering wheel.

There has been a steering column with a changeable angle. When the steering column is tilted down, the steering reel is moved closer to a driver and further from his face. However, the steering wheel is close to the driver's legs and causes the driver some troubles in moving his legs.

There has been a steering column set with a changeable angle and an extensible length. The tilting and extension of the steering column set is however conducted manually.

The present invention is therefore intended to obviate or at least alleviate the problems encountered in prior art.

SUMMARY OF INVENTION

The primary objective of the present invention is to provide a steering column set with a changeable angle and an extensible length.

According to the present invention, a steering column set includes a first steering column, a second steering column, an extending device and a tilting device. The first steering column is connected to a steering wheel. The second steering column is telescopically connected to the first steering column. The extending unit is used to move the first steering column with respect to the second steering column. The tilting unit is used to tilt the first and second steering columns.

Other objectives, advantages and features of the present invention will become apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
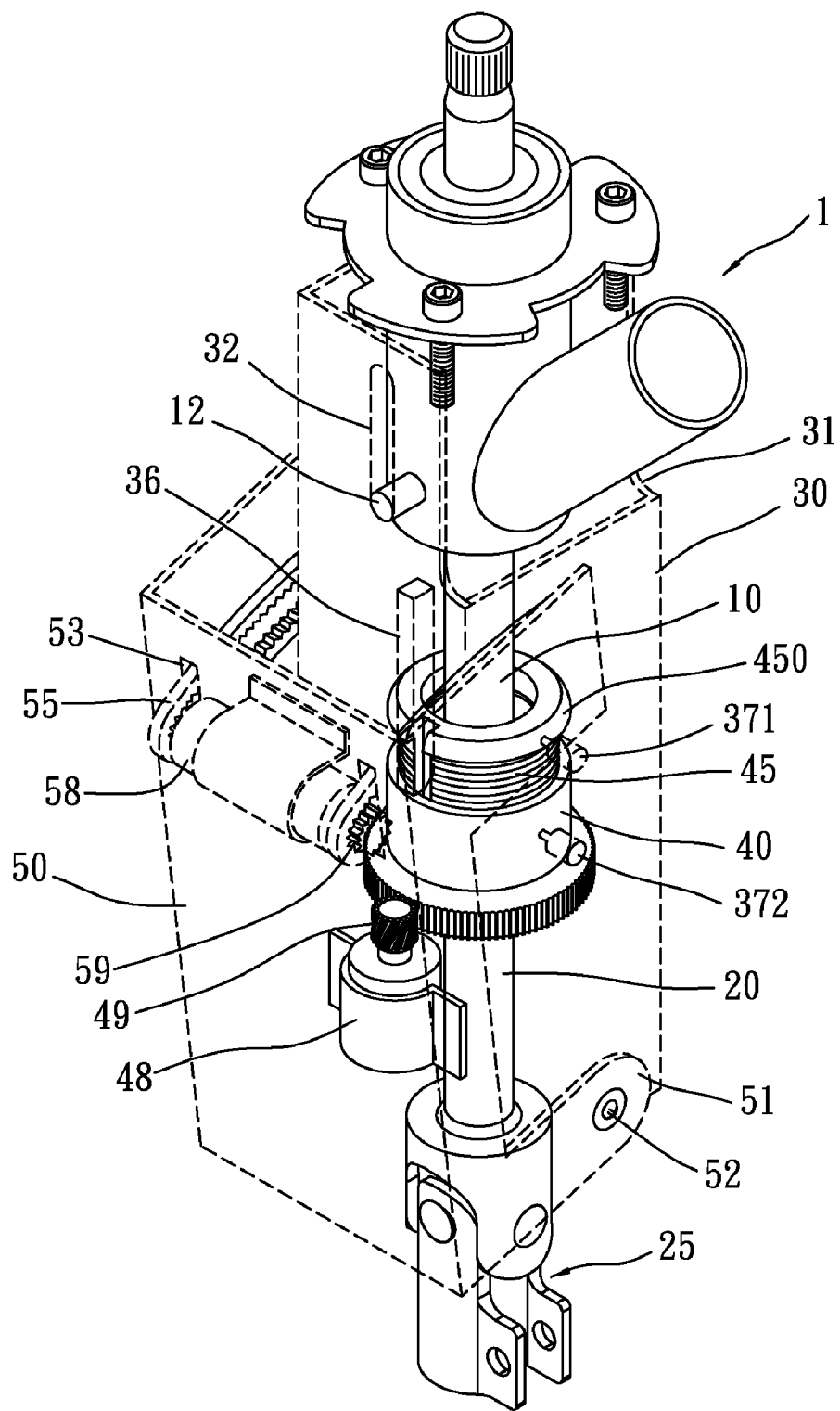
FIG. 1 is a perspective view of a steering column set with changeable angle and length according to the preferred embodiment of the present invention.
Figure 2:
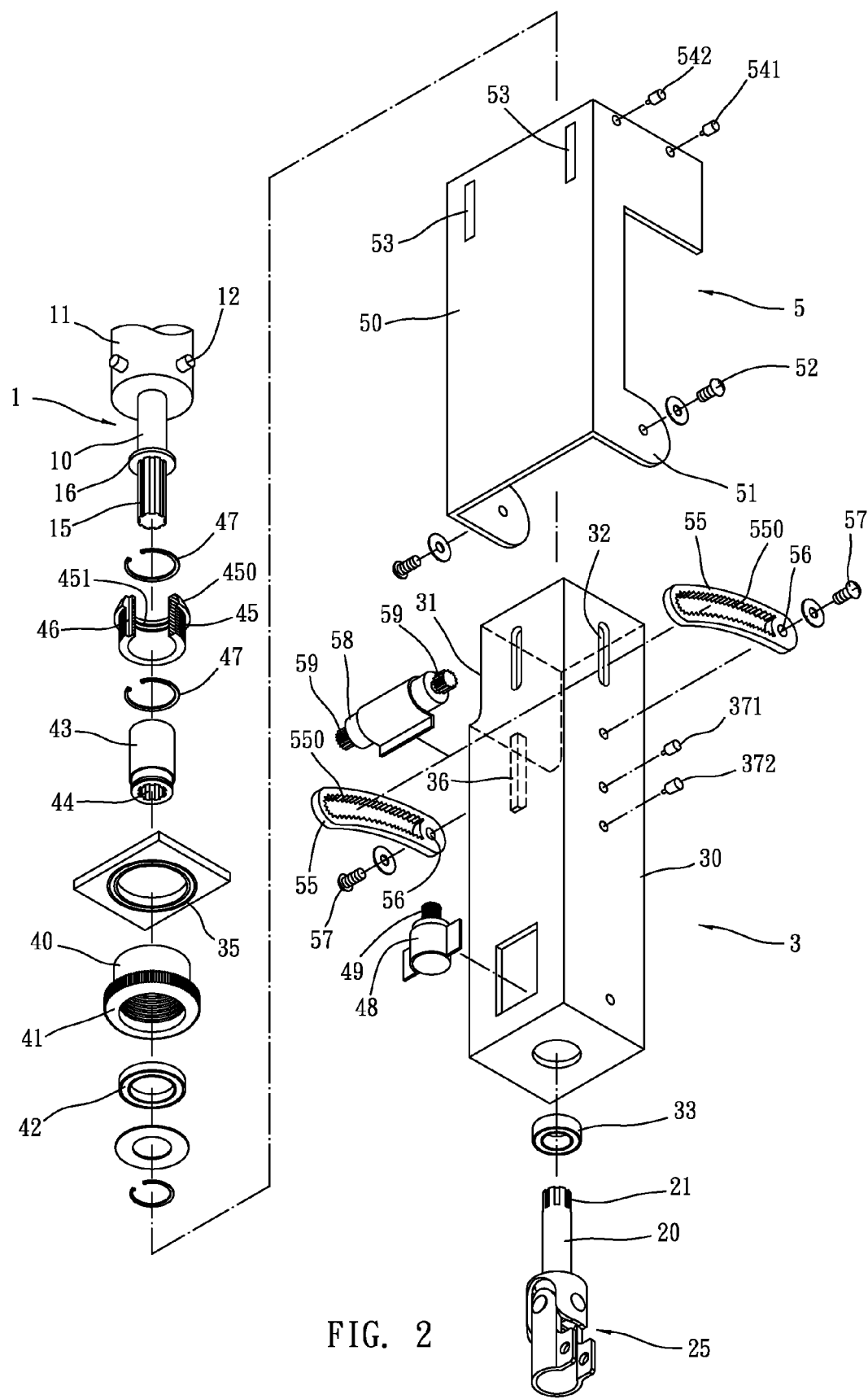
FIG. 2 is an exploded view of the steering column set shown in FIG. 1.
Figure 3:
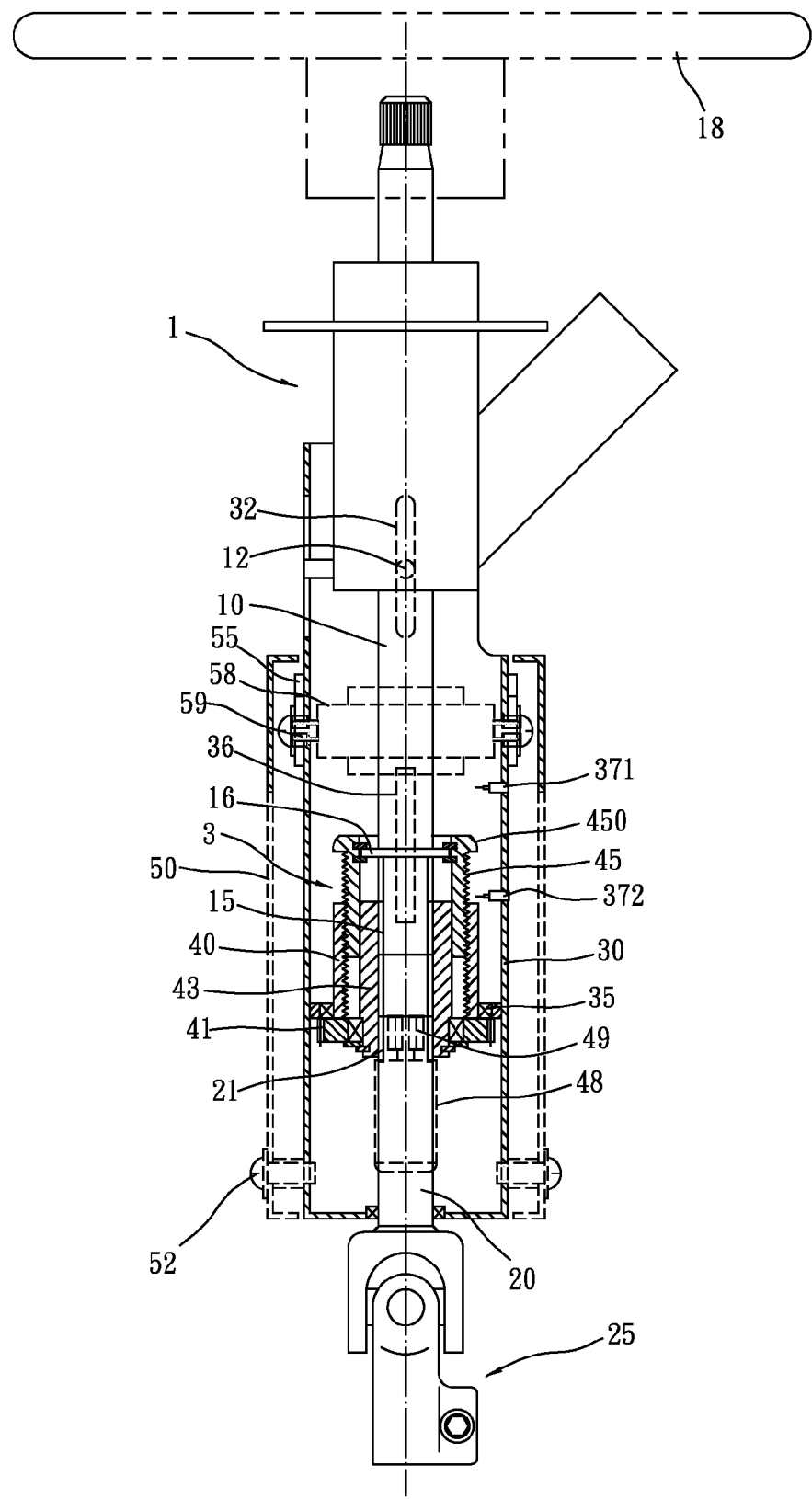
FIG. 3 is a cross-sectional view of the steering column set shown in FIG. 1.

Referring to FIGS. 1 through 3, a steering column set 1 is arranged between a steering wheel 18 and a universal joint 25. The steering column set 1 can be tilted and extended according to the preferred embodiment of the present invention.

The steering column set 1 includes a first steering column 10 connected to the steering wheel 18, a second steering column 20 connected to the universal joint 25, an extending unit 3 for extending the length thereof and a tilting unit 5 for changing the angle thereof.

A protective collar 11 is provided on the first steering column 10. An ignition, a turn signal controlling rod and a windshield wiper controlling rod are connected to the protective collar 11. A rod 12 is formed on the protective collar 11.

The first steering column 10 includes an annular flange 16 formed thereon and ridges 15 formed below the annular flange 16.

The second steering column 20 is formed with ridges 21 corresponding to the ridges 15.

The extending unit 3 includes a shell 30 with an opening 31 defined near the top thereof, a slot 32 defined opposite to the opening 31, an aperture defined in the bottom thereof and a ridge 36 formed on an internal side thereof.

The second steering column 20 is inserted through the opening defined in the bottom of the shell 30. A bearing 33 is used to allow smooth rotation of the second steering column 20 in the shell 30.

A motor 48 is attached to the shell 30. The motor 48 is preferably a servomotor. A pinion 49 is operatively connected to the motor 48.

A internally threaded ring 40 is formed together with a gear 41 that is hollow. The gear 41 is engaged with the pinion 49. The internally threaded ring 40 of course includes a thread formed on an internal side thereof. A bearing 35 is used to allow smooth rotation of the internally threaded ring 40 in the shell 30.

An externally threaded ring 45 includes a thread formed on an external side thereof, a longitudinal groove 46 defined in the external side thereof, an annular flange 450 formed on the external side thereof and two annular grooves 451 defined in an internal side thereof. The externally threaded ring 45 is engaged with the internally threaded ring 40. The longitudinal groove 46 receives the ridge 36. Thus, the externally threaded ring 45 is moved along the ridge 36 when the internally threaded ring 40 is driven by the motor 48.

The first steering column 10 is inserted through the externally threaded ring 45. The annular flange 16 is located between the annular grooves 451. Two C-clips 47 are fit in the annular grooves 451. Thus, the first steering column 10 is movable along with the externally threaded ring 45. The rod 12 is inserted through the slot 32. Thus, the movement of the first steering column 10 in the shell 30 is limited by the rod 12 in the slot 32.

Two sensors 371 and 372 are attached to the shell 30 for detecting the first steering column 10. The sensors 371 and 372 are electrically connected to the motor 48. The motor 48 is stopped when the first steering column 10 is detected by any of the sensors 371 and 372.

A sleeve 43 includes grooves 44 for receiving the ridges 15 and 21 so that the first steering column 10 is telescopically connected to the second steering column 20. A bearing 42 is used so that the nut 41 can be rotated around the sleeve 43.

Figure 4:
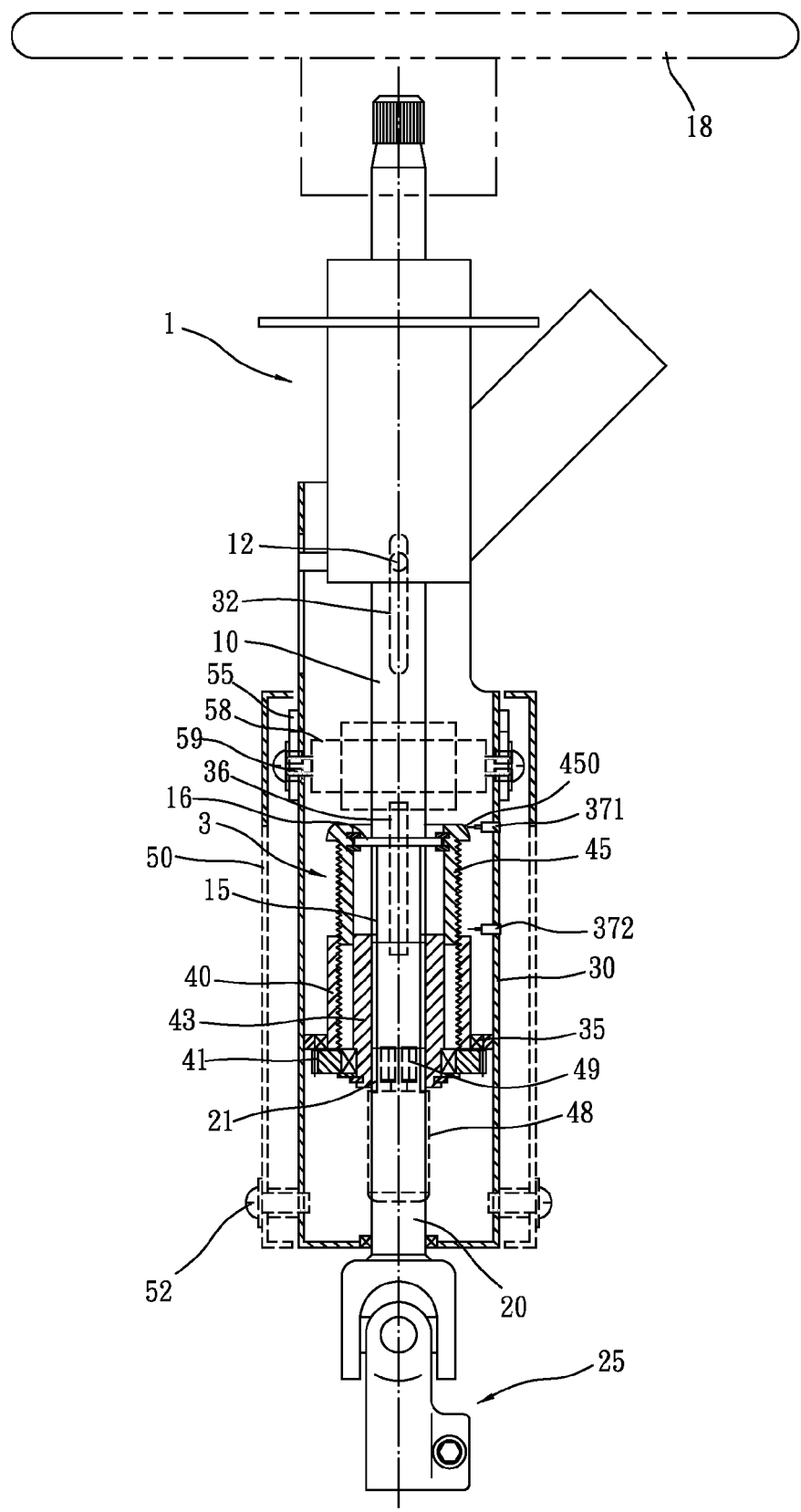
FIG. 4 is a cross-sectional view of the steering column set in another position than shown in FIG. 3.
Figure 5:
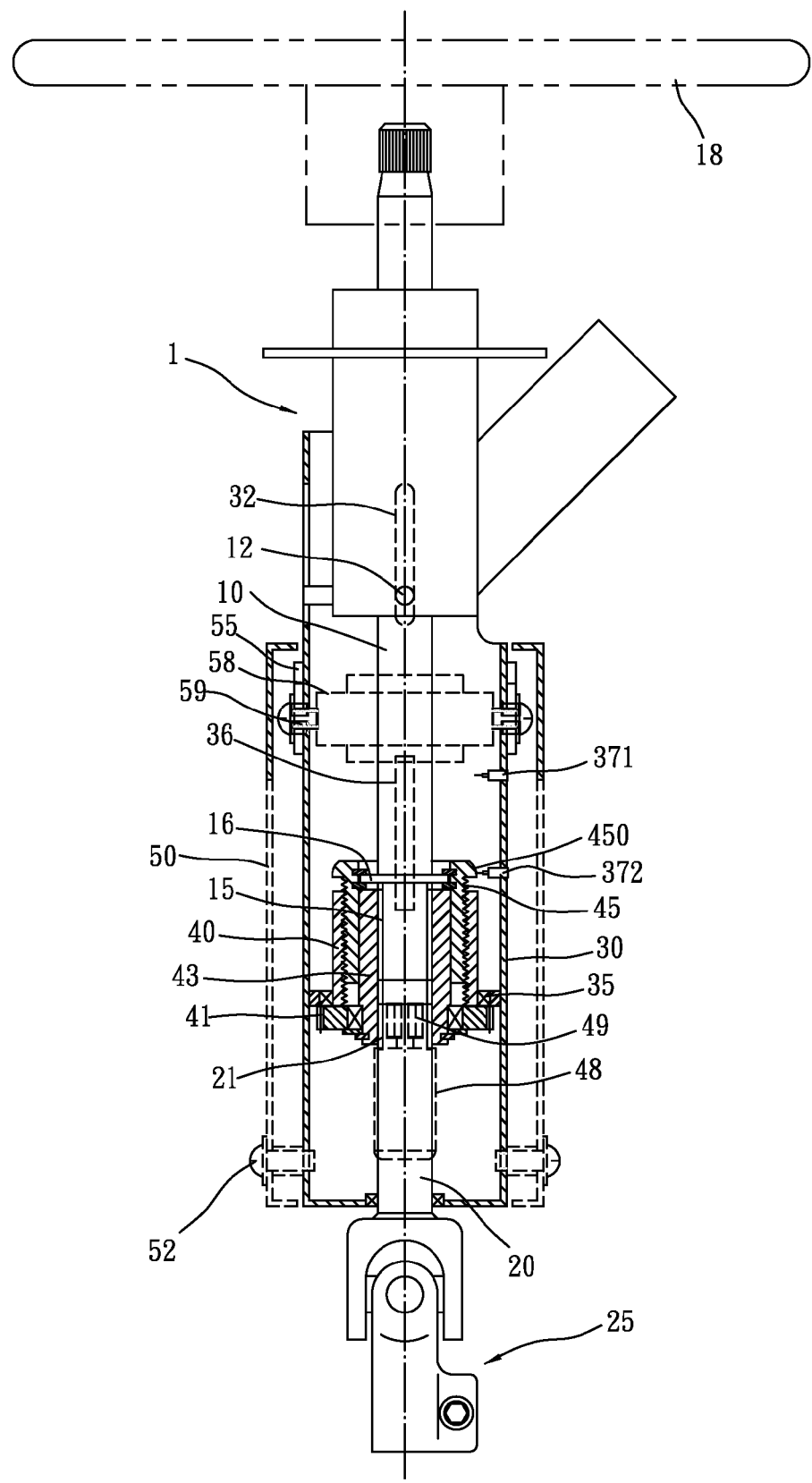
FIG. 5 is a cross-sectional view of the steering column set in another position than shown in FIG. 4.
Figure 6:
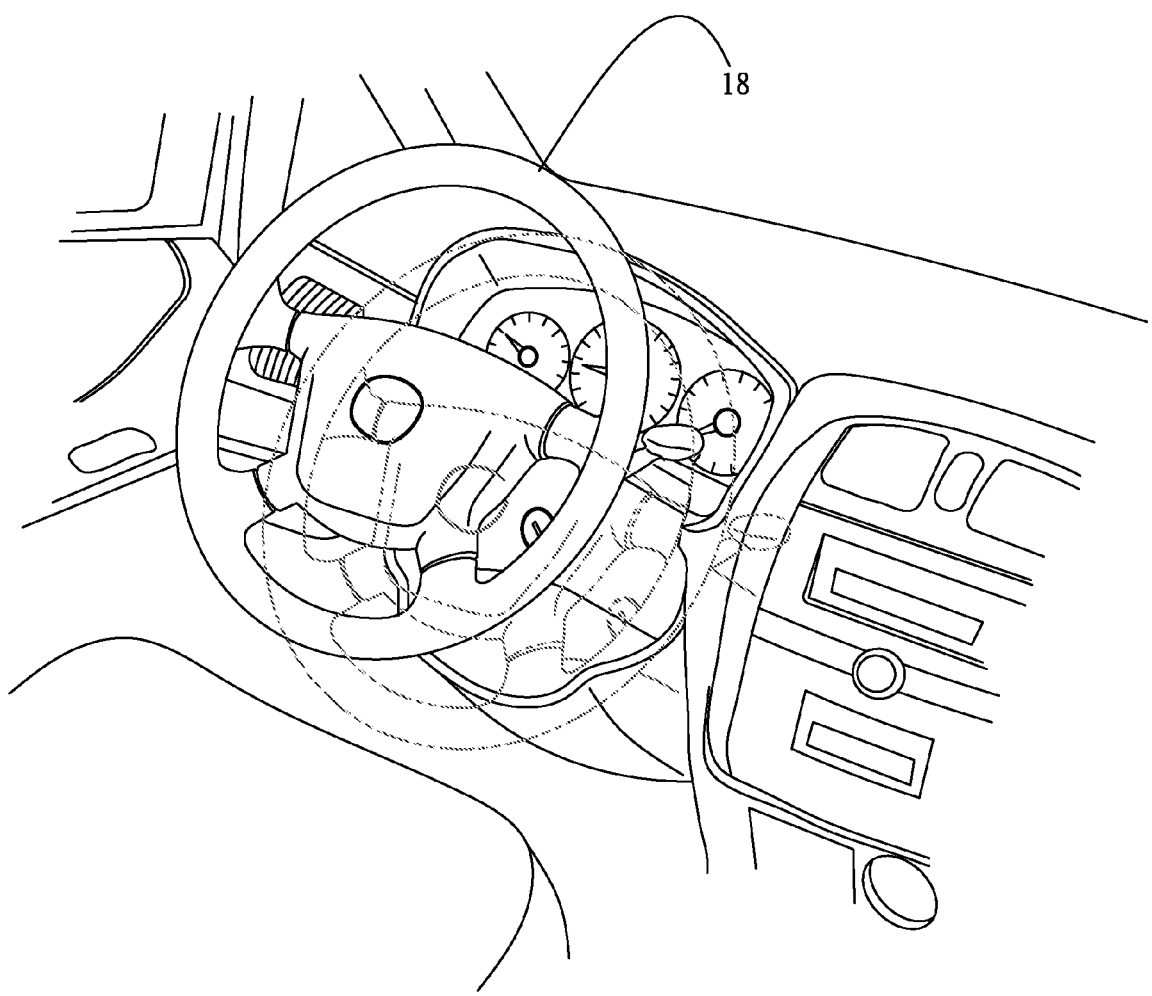
FIG. 6 is a perspective partial view of the interior of a vehicle equipped with the steering column set shown in FIG. 1.

The motor 48 rotates the internally threaded ring 40 as the pinion 49 engages with the gear 41. The internally threaded ring 40 drives the externally threaded ring 45 that in turn drives the first steering column 10 relative to the second steering column 20. The steering column set 1 is extended as shown in FIG. 4 or shortened as shown in FIG. 5. Referring to FIG. 6, the steering wheel 18 is lifted or lowered when the steering column set 1 is extended or shortened.

Referring to FIG. 2 again, the tilting unit 5 includes a frame 50, two racks 55, two pinions 59 and a motor 58. The frame 50 is formed with two ears 51. A fastener 52 is driven into the shell 30 through each of the ears 51 in order to pivotally connect the shell 30 to the frame 5. The fasteners 52 are preferably threaded bolts. The racks 55 are inserted through two slots 53 defined in the frame 5. The racks 55 extend in an arc. A fastener 57 is driven into the shell 30 through an aperture 56 defined in each of the racks 55 so that the racks 55 are pivotally connected to the shell 30. Preferably, the fasteners 57 are threaded bolts. The pinions 59 are engaged with teeth 550 of the racks 55. The motor 58 is preferably a servomotor. The motor 58 is connected to the pinions 59. The motor 58 is attached to the frame 50. Two sensors 541 and 542 are attached to the frame 5.

Figure 7:
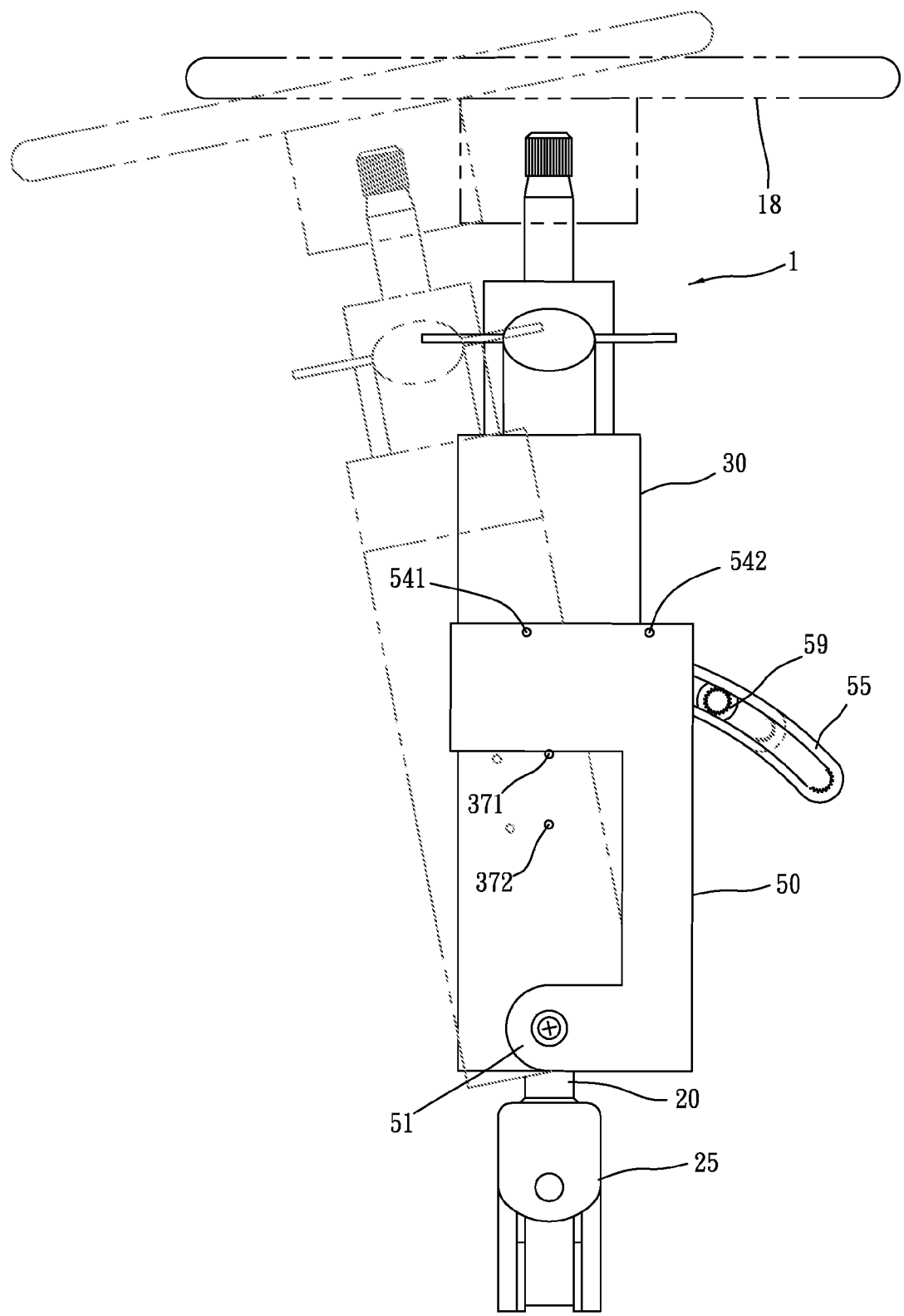
FIG. 7 is a side view of the steering column set shown in FIG. 1.
Figure 8:
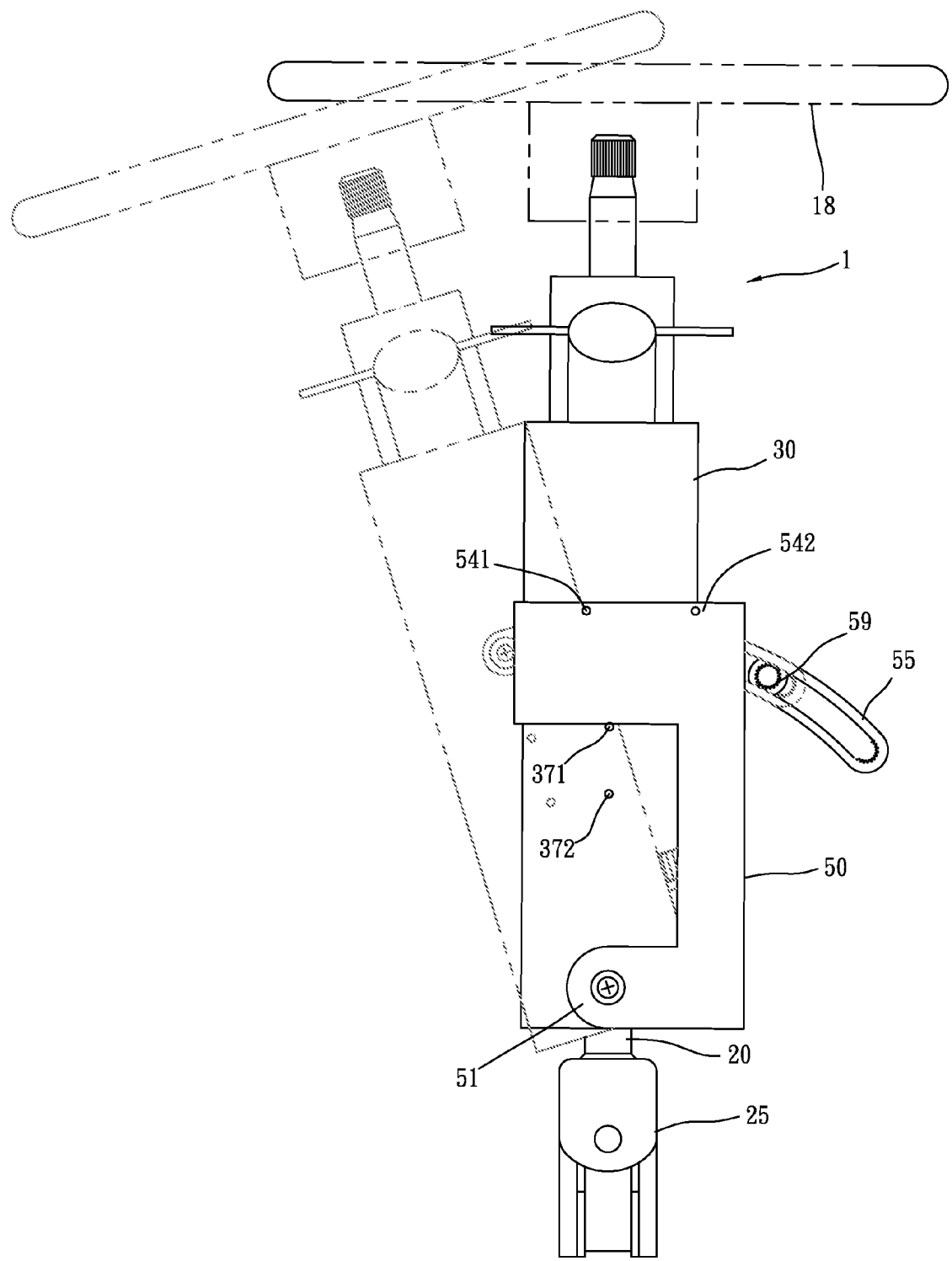
FIG. 8 is a side view of the steering column set in another position than shown in FIG. 7.
Figure 9:
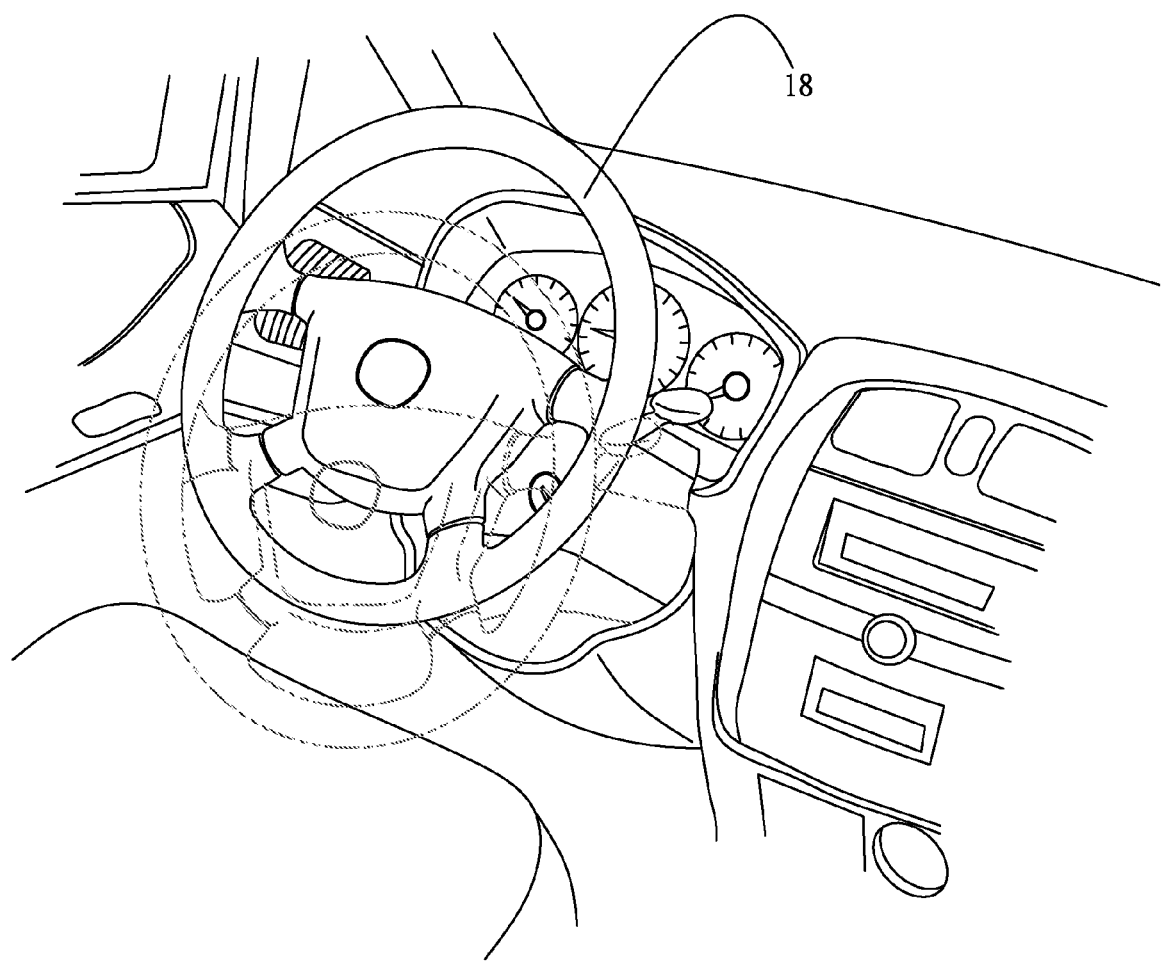
FIG. 9 is a perspective partial view of the interior of the vehicle with the steering column set in another position that shown in FIG. 1.

The motor 58 rotates the pinions 59 that in turn move the racks 55 so that the shell 50 is pivoted relative to the shell 30. Thus, the steering column set 1 is tilted as shown in FIGS. 7 through 9. The motor 58 is stopped when the shell 30 is detected by any of the sensors 541 and 542.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A steering column set comprising:
a first steering column connected to a steering wheel;
a second steering column telescopically connected to the first steering column;
an extending unit for moving the first steering column with respect to the second steering column, the extending unit comprising a shell for receiving the first and second steering columns, the shell including a ridge formed thereon; a first threaded ring attached to the shell; a second threaded ring engaged with the first threaded ring and connected to the first steering column, the second threaded ring including a longitudinal groove for receiving the ridge so that the second threaded ring is moved when the first threaded ring is rotated; and a motor for rotating the first threaded ring that in turn moves the second threaded ring so as to move the first steering column relative to the second steering column; and
a tilting unit for tilting the first and second steering columns.

2. A steering column set comprising:
a first steering column connected to a steering wheel;
a second steering column telescopically connected to the first steering column;
an extending unit for moving the first steering column with respect to the second steering column;
a sleeve for telescopically connecting the first steering column to the second steering column; and
a tilting unit for tilting the first and second steering columns,
wherein the first steering column comprises a plurality of first ridges formed thereon, the second steering column comprises a plurality of second ridges formed thereon, and the sleeve comprises a plurality of grooves for receiving the first ridges of the first steering column and the second ridges of the second steering column.

* * * * *